Sept. 30, 1952 E. C. WHITE 2,612,417
BEARING UNIT STRUCTURE
Filed Oct. 11, 1949 2 SHEETS—SHEET 1
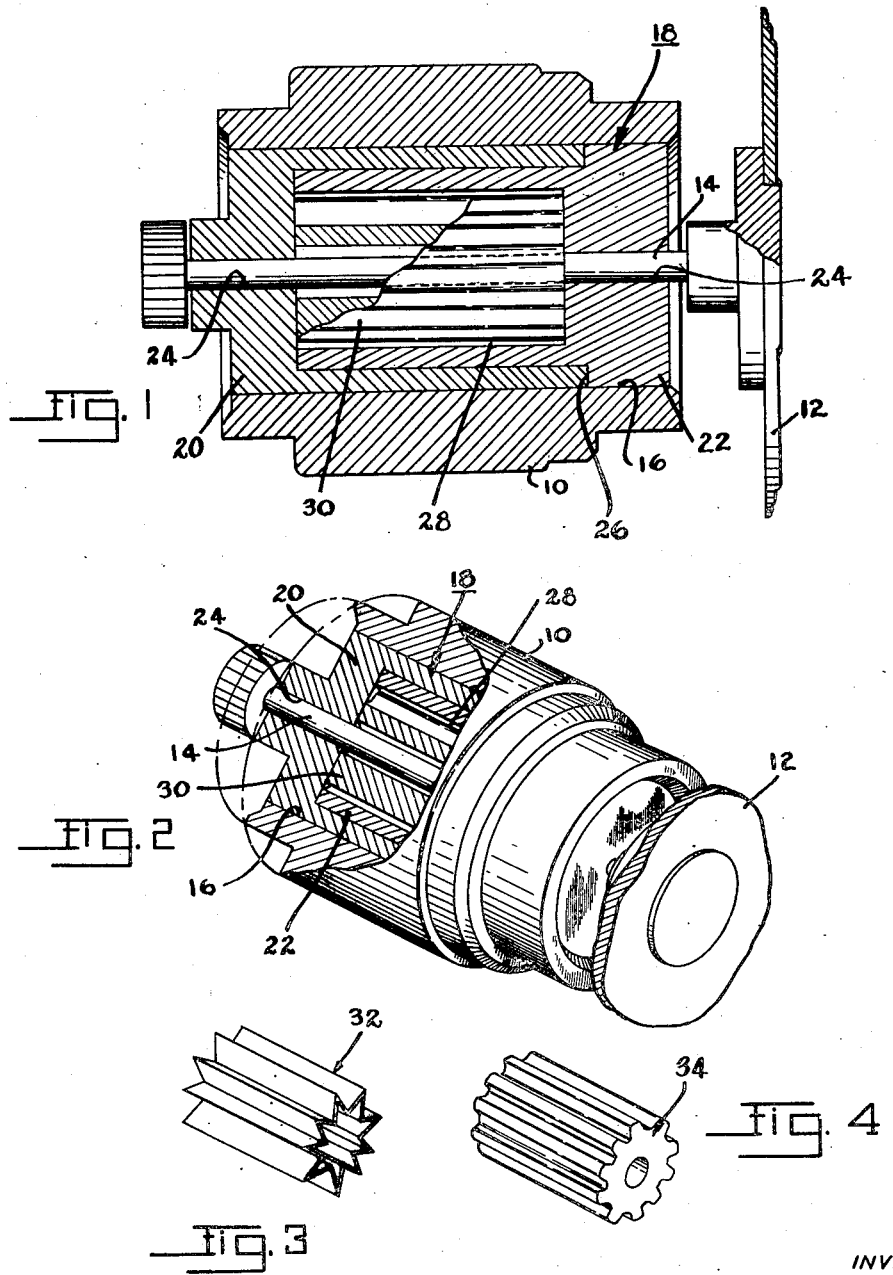
INVENTOR
ELZIE CLAY WHITE
BY
Toulmin & Toulmin
ATTORNEYS

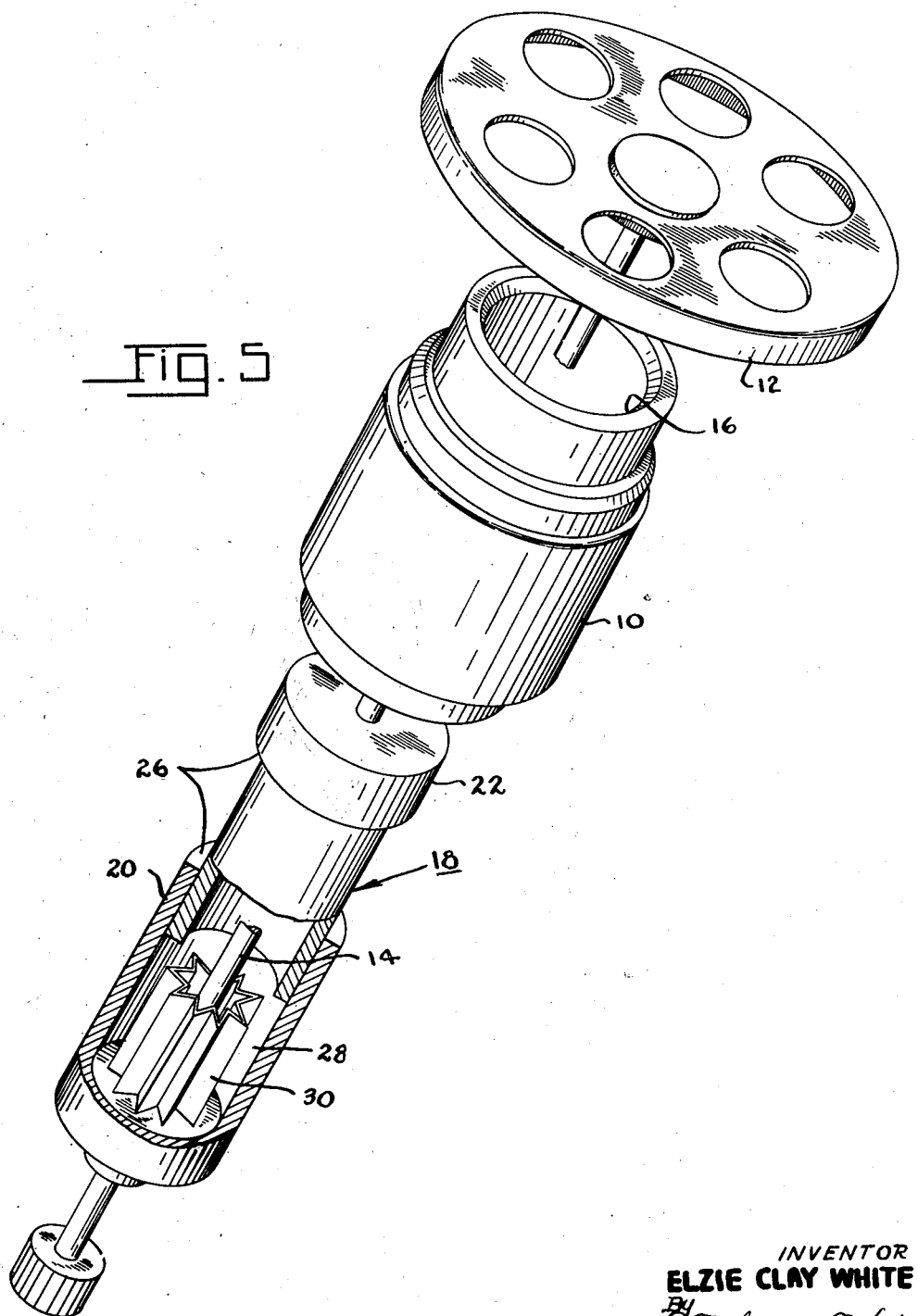

Patented Sept. 30, 1952

2,612,417

UNITED STATES PATENT OFFICE 2,612,417

BEARING UNIT STRUCTURE

Elzie C. White, Princeton, Ind., assignor to Hansen Manufacturing Company, Princeton, Ind., a corporation of Indiana Application October 11, 1949, Serial No. 120,740

4 Claims. (Cl. 308—132)

This invention relates to bearing constructions and is particularly concerned with an improved bearing construction for electric clock motors and the like.

In the manufacture of electric clock motors and similar articles of commerce, it has always been difficult to provide a proper bearing for the rotating part of the motor and to maintain the bearing properly lubricated at all times. This comes about because the bearings are necessarily rather small, and after being machined and cleaned, and then assembled with other parts of the motor, do not always provide the exact alignment necessary properly to support the rotor of the motor.

With particular regard to electric clock motors, the rotor thereof is driven by a very small torque so that of necessity only a small bearing area for the shaft of the rotor can be provided, because otherwise the frictional drag of the bearing on the rotor shaft would materially detract from the power output thereof.

This has led to the practice of providing spaced bearings for the rotor shaft so that a fairly small area of contact between the rotor shaft and bearings can be maintained, but, at the same time, the rotor shaft is firmly held in position.

As explained above, bearings of this type are difficult to mount in proper alignment and, additionally, are difficult to lubricate properly in order to give them the desired length of life.

The particular object of the present invention is the provision of an improved bearing construction which overcomes the difficulties referred to above.

Another object is the provision of a bearing construction in which spaced bearing areas which are in exact alignment at all times are provided.

A still further object is the provision of an improved bearing construction including an improved arrangement for insuring adequate lubrication of the bearing surfaces at all times.

A still further object is the provision of a bearing arrangement in which more exact results are obtained than has heretofore been possible and by means of substantially conventional machining operations.

These and other objects and advantages will become more apparent upon reference to the following description taken in connection with the accompanying drawings, in which:

Figure 1 is a sectional view taken through a bearing arrangement according to my invention;

Figure 2 is a perspective view thereof partly broken away;

Figures 3 and 4 are perspective views of oil retaining means to be assembled with the bearing for insuring a continuous supply of lubricant to the bearing surfaces; and Figure 5 is a perspective view similar to Figure 2, but showing the parts in partially disassembled positions.

Referring to the drawings somewhat more in detail, the bearing arrangement shown therein is especially constructed for use in connection with small electric clock motors. The entire motor is not illustrated in the drawings, because the particular construction thereof forms no part of the instant invention. Such a motor, however, comprises a central magnetic hub part 10 and a rotor 12, the said rotor part being driven by the magnetic field established by the coil of the motor which is mounted about the hub part 10.

Rotor 12 comprises a shaft 14 extending axially through bore 16 in hub 10. Shaft 14 is journaled on the bearing arrangement of this invention, and which is mounted in bore 16, as generally indicated at 18. The said bearing comprises a pair of telescopic cylinder parts 20 and 22, each of which has the bearing surface 24 thereon adjacent the end.

As will be seen in Figure 1, member 22 is shouldered at 26, so that when the members are placed together in their assembled position, they form a substantially cylindrical unit which can readily be placed in bore 16 of hub 10.

Member 22 is centrally axially bored, as at 28, so that when members 20 and 22 are placed together, as shown, they define a cavity between the bearing surfaces 24 and around shaft 14. This cavity is employed to advantage as a lubricant reservoir for providing a continuous supply of lubricant to shaft 14 and bearing surfaces 24.

Preferably, there is provided with the cavity an oil retaining member 30 which is so constructed as to have a capillary action so that regardless of the position in which the motor is mounted, oil within the cavity will be carried to both of the bearing surfaces 24.

According to one form which my invention may take, this oil retaining member may comprise a crimped or fluted sleeve, as indicated at 32 in Figure 3. Another form which the member may take is that of a longitudinally slotted gear-like element, as indicated at 34 in Figure 4. In either case, the oil retaining member loosely surrounds the shaft 14 and is also loosely disposed within the cavity defined by the members 20 and 22, but has sufficiently small clearance either about the shaft, or about the walls, or ends of the cavity, so that any oil within the said cavity is carried by capillary action.

The parts 20 and 22 of the bearing arrangement are made of any suitable good bearing material, such as bronze which is turned out to the proper shape by machining, such as by a screw machine. Other materials also suggest themselves for use as bearing materials, such as certain plastics or combinations of plastic and metal according to practices well known in the bearing art.

The oil retaining member similarly can be manufactured of a number of different materials, and I have found aluminum, brass, bronze, and tin coated materials to be highly satisfactory for establishing the capillary spaces internally of the bearing arrangement for the storing of lubricant.

In the manufacturing of the bearing arrangement, the parts 20 and 22 are individually manufactured, so that they telescope together as illustrated in Figure 1. This can be done by turning the parts out on a screw machine or by molding the parts, and thereafter turning them.

The preferable manner of manufacturing the bearing according to this invention is to individually form the two parts thereof by screw machining operations or the like, each part being completely formed during one setup. Thus, the internal member 18 would be turned both externally and internally and also have its bearing bore drilled and reamed in one set-up of the screw machine, whereas the external part 20 would at least be internally bored and would have its bearing surface bored and reamed. Both of the parts could, of course, be externally finished along their largest diameters if desired.

After the bearing parts are individually formed, they are cleaned and then, when they are brought together, the closely fitting turned parts provide for an exact radial alignment of the bearing surfaces 24. At the same time shoulder 26 provides for an exact spacing of the said bearing surfaces, so that by manufacturing the bearing according to this invention, there results a bearing assembly characterized by having bearing surfaces that are automatically located by the assembling of the parts in both radial and axial directions. The benefits of this will be obvious in connection with the production of motors of the type referred to.

It will be evident that while the preferred manner of manufacturing the bearing assembly is to turn out the parts thereof from bearing bronze or the like in a screw machine, a similar bearing structure could be had by molding the individual parts of the assembly from plastic material, either metallic or nonmetallic, and including in the combination suitable anti-friction agents such as oil or graphite, if desired.

It will also be apparent that, if desired, the two parts of the bearing assembly could be machined so as to telescope together but without the bearing surfaces thereof being finally finished. In this case, the two parts of the bearing assembly could be brought together in telescopic relationship, the bearing surfaces provided by drilling and reaming the end parts of the bearing members.

In either case, it will be noted that due to the manufacturing steps recited above, the bearing surfaces 24 on the two parts of the bearing will be in exact alignment when the bearing parts are reassembled and mounted in the motor hub. These bearing surfaces will also be exactly concentric to bore 16 and hub 10 and will be firmly supported thereon so that when the rotor is placed in position with its shaft supported by the bearing surfaces 24, the rotor will be exactly positioned relative to the other parts of the motor.

The cavity within the bearing structure having been filled with oil at the time of assembly of the bearing, provides a reservoir for lubricant which will maintain the bearing surfaces 24 adequately lubricated for a considerable length of time.

The net results of the bearing arrangement described above and manufactured according to the manufacturing steps set forth is an improved motor arrangement in which the rotor is assured of being in proper alignment with the other parts of the motor, and is supported on exactly aligned and adequately lubricated bearings.

It will be understood that this invention is susceptible to modification in order to adapt it to different usages and conditions, and, accordingly, it is desired to comprehend such modifications within this invention as may fall within the scope of the appended claims.

I claim:

1. A bearing having spaced relatively short bearing surfaces and a relatively long cavity therebetween and a rigid capillary element in said cavity surrounding and spaced from the space through which a shaft journaled in said surfaces extends and operable to convey lubricant from said cavity to said bearing surfaces by capillary action regardless of the position of said bearing, said element comprising a cylindrical member having axially extending grooves in its outer periphery.

2. A bearing having spaced relatively short bearing surfaces and a relatively long cavity therebetween and a rigid capillary element in said cavity surrounding and spaced from the space through which a shaft journaled in said surfaces extends and operable to convey lubricant from said cavity to said bearing surfaces by capillary action regardless of the position of said bearing, said element comprising a cylindrical member having a bore of greater diameter than that of the said shaft and axial grooves on its outer surface, the outside diameter of the element being such a size relative to the diameter of the cavity as always to space the wall of said bore from the surface of a shaft in the bearing.

3. A bearing having spaced relatively short bearing surfaces and a relatively long cavity therebetween and a rigid capillary element in said cavity surrounding and spaced from the space through which a shaft journaled in said surfaces extends and operable to convey lubricant from said cavity to said bearing surfaces by capillary action regardless of the position of said bearing, said element comprising a sleeve of thin material crimped longitudinally and of substantially the same length as said cavity, and of substantially the same diameter as said cavity whereby the element is always spaced from the surface of a shaft in the bearing.

4. A bearing unit comprising a pair of elongated hollow sleeves each closed at one end and having concentric internal and external cylindrical surfaces throughout the respective lengths thereof, said closed ends each having axially extending bores centrally disposed therein to receive a shaft, the internal diameter of one sleeve being substantially equal to the external diameter of the other sleeve for permitting said sleeves to be placed together in telescopic engagement to axially align said bores, a shoulder on the said one sleeve to abut the end of the other sleeve to provide a cylindrical cavity therebetween of predetermined length with said bores spaced apart the length of said cylindrical cavity and of shorter lengths respectively relative to the axial length of said cavity, and means in the cavity formed by the telescoped sleeves to supply lubricant from the said cavity to the bearing surface of said shaft receiving bores by capillary action.

ELZIE C. WHITE.

REFERENCES CITED

The following references are of record in the file of this patent:

UNITED STATES PATENTS

| Number | Name | Date |
| --- | --- | --- |
| 309,373 | Badger | Dec. 16, 1884 |
| 720,612 | McWilliams | Feb. 17, 1903 |
| 956,607 | Snyder | May 3, 1910 |
| 1,159,645 | Brown | Nov. 9, 1915 |
| 1,854,897 | Ganster | Apr. 19, 1932 |
| 1,884,104 | Moore | Oct. 25, 1932 |
| 2,180,883 | Scott | Nov. 21, 1939 |

FOREIGN PATENTS

| Number | Country | Date |
| --- | --- | --- |
| 134,488 | Germany | Sept. 4, 1902 |
| 367,183 | Germany | Jan. 19, 1923 |
| 663,245 | Germany | Aug. 3, 1938 |